United States Patent [19]

Clark

[11] 4,143,251
[45] Mar. 6, 1979

[54] CIRCUITRY AND METHOD FOR LOCATING BURIED CABLE SPLICES

[75] Inventor: Brian D. Clark, Mesa, Ariz.

[73] Assignee: Progressive Electronics, Inc., Mesa, Ariz.

[21] Appl. No.: 846,372

[22] Filed: Oct. 28, 1977

[51] Int. Cl.² .............................................. H04B 3/46
[52] U.S. Cl. ................................ 179/175.3 A; 325/29
[58] Field of Search ................ 179/175.3 A, 175.3 F, 179/175.31 R; 325/29, 119, 149, 151; 324/52, 66

[56] References Cited

U.S. PATENT DOCUMENTS

| 2,444,426 | 7/1948 | Busignies | 179/175.31 R |
| 3,128,431 | 4/1964 | Walker | 325/119 |
| 3,424,993 | 1/1969 | Clar | 325/151 |
| 3,496,471 | 2/1970 | Shelton | 325/151 |
| 3,882,394 | 5/1975 | Koster et al. | 325/119 |

OTHER PUBLICATIONS

*The Radio Amateur's Handbook*, 1972, p. 54.
Dynatel Corporation 500, Jan. 1974.

*Primary Examiner*—Douglas W. Olms
*Attorney, Agent, or Firm*—Cahill, Sutton & Thomas

[57] ABSTRACT

Circuitry and method for locating buried splices and features of concealed or buried telephone cables or other objects. A small, sealed, low power transmitter is encapsulated with the splice and is concealed or buried therewith. A pair of wires for providing operating power to the transmitter is included in the telephone cable and extends from an exciter circuit to the transmitter. The exciter circuit produces a periodic power waveform on the pair of wires. The transmitter includes a radio frequency oscillator, an amplifier, and a ferrite antenna. The exciter circuit includes an audio frequency oscillator and a driver circuit to provide the periodic power signal to the pair of wires. The radio frequency output signal of the transmitter is modulated by the frequency of the power signal. A portable receiver is tuned to the frequency of the signal transmitted by the buried transmitter. The portable receiver is transported over the general location of the buried splice. The receiver includes a field strength meter for measuring the strength of the signal transmitted by the buried transmitter. The position of the receiver is varied until the received radio frequency signal field intensity is maximized. The receiver is then located directly over the buried transmitter.

11 Claims, 9 Drawing Figures

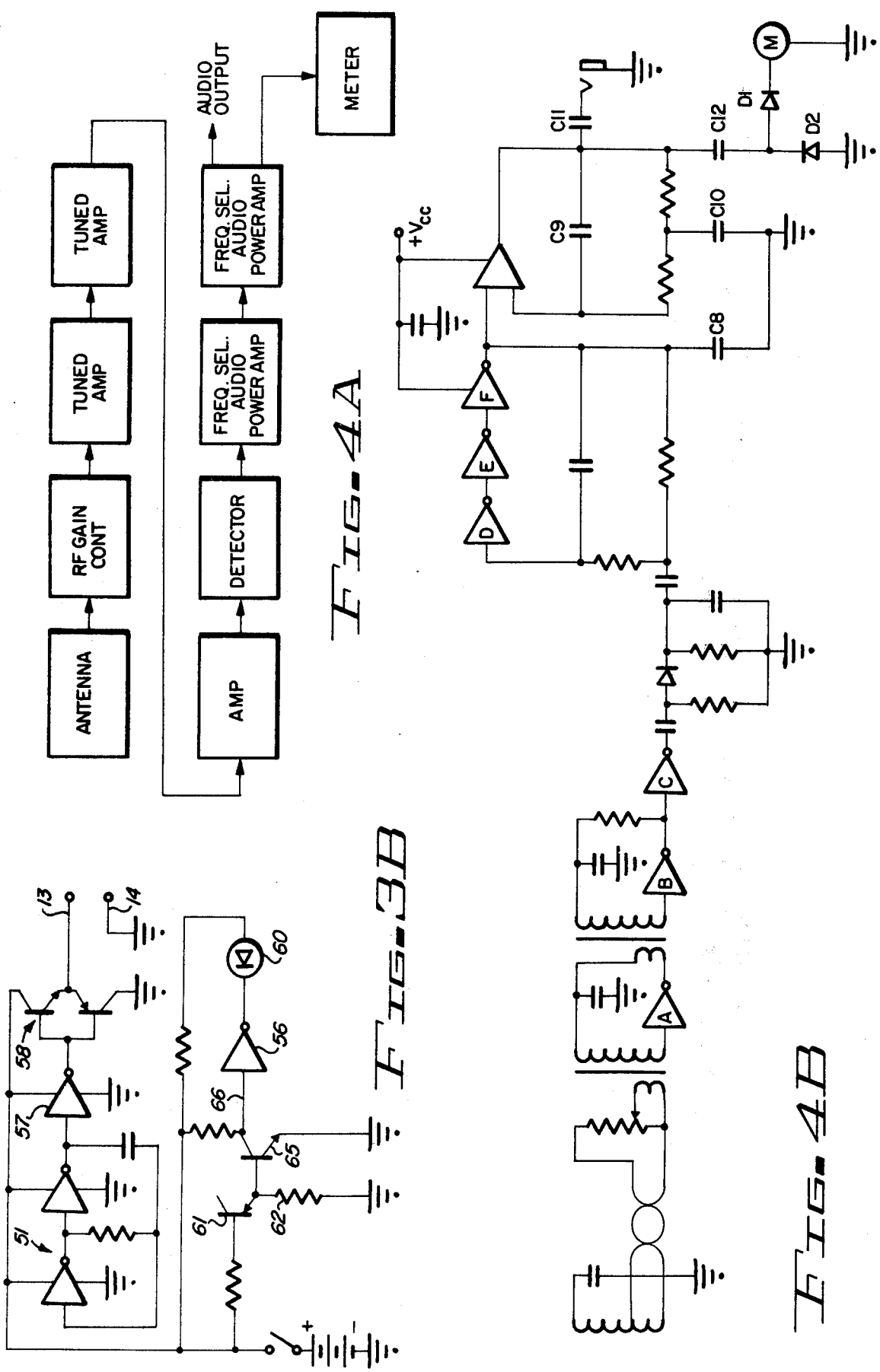

CIRCUITRY AND METHOD FOR LOCATING BURIED CABLE SPLICES

BACKGROUND OF THE INVENTION

1. Field of the Invention

The invention relates to methods of using transmitters and receivers to locate features of concealed objects and to circuitry for implementing such methods.

2. Description of the Prior Art

Telephone services are ordinarily provided by means of main telephone cable structures including a large number of conductors. Service to individual users is provided by means of individual telephone lines, referred to as "drops", connected to the main cable by means of "splices". Ordinarily, both the main cable and the "drops" are buried underground. Until recently, the main cables were periodically brought to the surface in metal boxes referred to as "enclosures". The "drops" were also brought to the surface in the enclosure closest to the user location. The installers would make the splices in the metal enclosures to connect "drops" for nearby users to appropriate conductors of the main telephone cable.

More recently, however, the metal enclosures are not utilized. Instead, a residential area to be served by the telephone system is premeasured. The cable manufacturing plant then accordingly measures the main cable and the "drop" conductors, makes the necessary splices, and seals or encapsulates the splices before the cable and "drops" are delivered to the residential location. The entire main cable, drop, and splice assembly is transported to the site and laid in previously excavated trenches. This method reduces costs by eliminating the need for metal enclosures and on-the-spot splice installation. However, splices have higher failure rates than other portions of the cable and drops, making it necessary to occasionally obtain access to splices in order to repair them. Presently it is difficult to identify the location of such buried splices.

One method of location underground point splices utilizes a large flat disc which contains a tuned conductive-capacitance circuit. The circuit has no active components. The disc is buried above the splice to be located. A high powered signal is transmitted into the ground near the location of the disc. This causes the buried tuned circuit in the disc to oscillate. The oscillation causes a signal to be radiated from the disc, wherefrom it is detected by a receiver which may be moved to maximize the intensity of the received signal, thereby indicating the location of the buried disc. Although this system has the advantage that no external power or control wires are required, the discs are large and inconvenient to use because they require careful alignment with the ground surface before being covered. The necessary precise alignment is often disturbed in the process of burying the cable and the discs. Further, the receiver must be carefully positioned on the opposite end of the long pole which supports the transmitter. The critical alignment of the disc unit and the precise spacing of the transmitter and receiver units on the pole causes the directly related transmitter signal to be cancelled in the receiver so that it detects only signals re-radiated from the underground tuned circuit. This requirement makes the detection assembly, including the transmitter and the receiver, very large and bulky and necessitates the above-mentioned critical alignment of the transmitter and receiver. A much lower cost, more convenient apparatus and method of detecting underground objects is needed.

SUMMARY OF THE INVENTION

Accordingly, it is an object of the invention to provide a simple, low cost technique and apparatus for locating concealed splices and other features of underground cables or other objects.

It is another object of the invention to provide method and circuitry for locating underground splices or objects, which method and apparatus do not require precise alignment of the transmitter and receiver.

It is another object of the invention to provide a transmitting device which may be latter utilized to identify a buried telephone splice location and which does not have to be precisely aligned over the buried splice prior to burying the splice.

Briefly described, and in accordance with one embodiment thereof, the invention provides apparatus and method for locating concealed locations and objects. A small transmitter is encapsulated in an encapsulating substance. The transmitter is positioned in a concealed location or adjacent a concealed object. A pair of wires referred to as a "control pair" provides operating power and, if desired, modulation information to the concealed transmitter, causing it to radiate a low power amplitude modulated radio frequency signal. The transmitter has a pair of wires which are spliced to the control pair. The transmitter may be utilized to locate underground splices of telephone "drops" to conductors of a main telephone cable, wherein the main telephone cable, the drops and the splices thereof are all buried. The transmitter is encapsulated, along with the telephone cable splice, by wrapping materials including sealant strips and a slide-on "sleeve", which is then shrunk with a heat source to provide a completed, sealed "splice bundle" which includes both the splice and the transmitter. The transmitter includes an rf oscillator, an amplifier, and an antenna. An exciter circuit produces a periodic power signal which powers the transmitter on the control pair. Since the transmitter output signal varies with the amplitude of the powering signal received by it, the transmitted signal is, in effect, amplitude modulated. A portable receiver with a field strength indicator is positioned to maximize the intensity of the amplitude modulated signal received from the transmitter. When the field strength is maximized, the receiver is located directly over the buried splice bundle.

BRIEF DESCRIPTION OF THE DRAWINGS

FIG. 3B is a schematic diagram of the exciter of FIG. 3A.

FIG. 4A is a block diagram of a receiver according to the invention.

FIG. 4B is a schematic diagram of the receiver of FIG. 4A.

DESCRIPTION OF THE INVENTION

The invention provides a very small transmitter which may be buried with objects which later need to be located, such as splices between main telephone cables and "drops" which provide telephone service to individual users. When it is necessary to locate a buried splice having a transmitter encapsulated therewith in a "splice bundle", in order to repair the splice, power is applied to a pair of wires referred to as a "control pair". The control pair is included among the conductors of the main telephone cable. The transmitter power conductors are connected to the control pair. A large number of buried transmitters may be connected to the control pair to identify the locations of numerous splices along the main telephone cable. The power signal applied to the control pair activates the transmitter, causing it to transmit a low power rf signal. A receiver tuned to the rf signal has a field strength meter. The receiver and field strength meter may be utilized to find the location of maximum received field strength, thereby indicating the location of the buried splices.

Figure 1A:
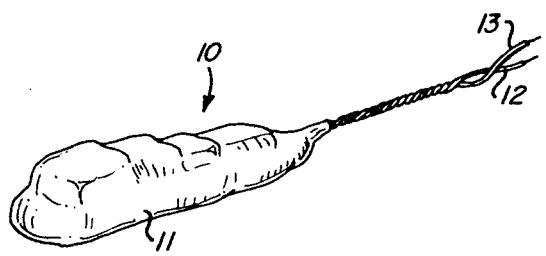
FIG. 1A shows one embodiment of the encapsulated transmitter of the invention.

FIG. 1A shows an encapsulated transmitter before it is connected to the control pair. Encapsulated transmitter 10 includes an encapsulated portion 11, wherein the transmitter is housed, and a pair of power conductors 12 and 13 extending from the main body of the device. The power conductors 12 and 13 are connected to the control pair to provide power to the transmitter. The material in which the transmitter is encapsulated is a polyester type of filler having the brand name "Hysol"; the filler material is readily available. This material protects the telephone cable shown in FIG. 1B from sharp edges of the transmitter assembly. The filler material is also rigid enough to mechanically protect the transmitter components from usual mechanical stresses.

Figure 1B:
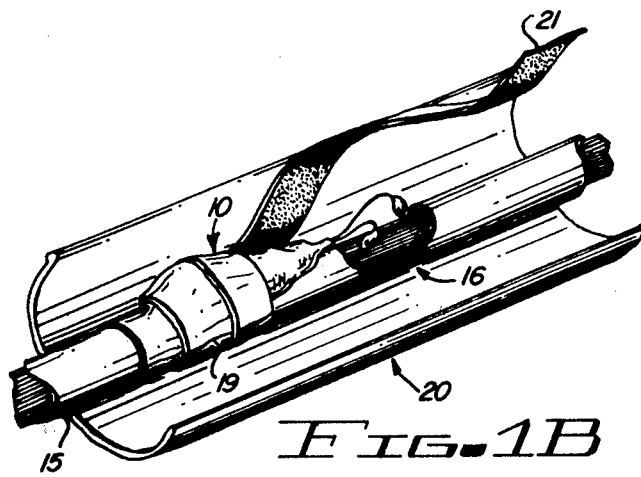
FIG. 1B shows an arrangement of the encapsulated transmitter of FIG. 1A spliced into a main telephone cable and the arrangement of encapsulating materials for the splice bundle.

Referring to FIG. 1B, encapsulated transmitter 10 is positioned along side main telephone cable 15. The power conductors 12 and 13 are electrically connected to the two "control pair" conductors 17 and 18 in main telephone cable 15 to provide operating power to the transmitter. A "drop" (individual extension line) 21 is also shown in FIG. 1B; the conductors of "drop" 21 are spliced to various conductors of main telephone cable 15 at splice location 16 thereof. Sealant strips 19 are wrapped around both the main cable and the encapsulated transmitter 10. Although not shown in FIG. 1B, the sealant strips also are wrapped around the entire splice location. A sleeve 20 is then wrapped around the entire assembly to form a "sleeve bundle". The materials for buried splice encapsulations are available from Raychem Corporation of Menlo Park, California. The sleeve is then heated by means of a blow torch or other heating element, causing the sleeve to shrink and form a seal with the sealant strips to produce the completed sleeve bundle of FIG. 1C. The sleeve bundle is then ready to be buried, and is resistant to moisture, abrasion, freezing, thawing, etc.

Figure 1C:
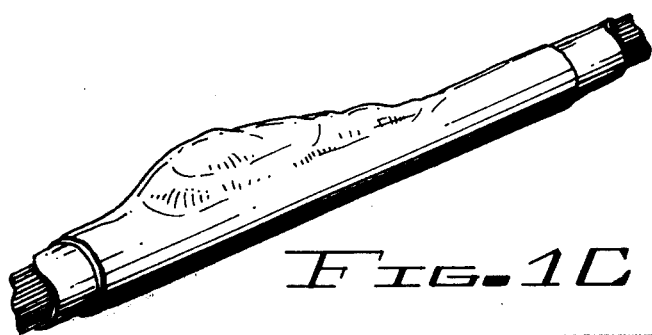
FIG. 1C shows the completed splice bundle including the main cable and the transmitter encapsulated therein.

The transmitter shown in FIGS. 1A-1C may thus be encapsulated with telephone cable splices by the telephone cable manufacturing plant. A modern technique of providing telephone service to individual users is to premeasure an entire subdivision, and accordingly prefabricate an entire telephone cable assembly including the splices and drops necessary to provide service to the individual houses in the subdivision. The entire cable assembly is then transported to the subdivision, laid in previously excavated trenches, and buried. The control pair and all of the transmitters attached thereto at each of the respective splice locations are assembled as shown in FIGS. 1A-1C at the telephone cable manufacturing factory; the entire assembly is then installed and buried.

The location of all such splices may be later determined if necessary by powering the control pair and utilizing a receiver to "home in" on the location of the buried splice bundles in order to locate the splices and subsequently service them.

Figure 2A:
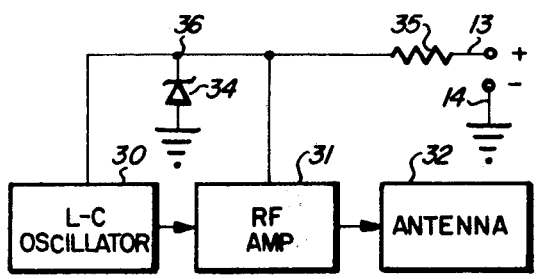
FIG. 2A is a block diagram of one embodiment of the transmitter.

Referring to FIG. 2A, a block diagram of transmitter 10' is shown. In its simplest form, transmitter 10, merely includes an L-C oscillator 30, an rf amplifier 31, and a ferrite antenna 32. Control pair conductors 13 and 14 provide operating power to the transmitter. Resistor 35 is connected between power conductor 13 and node 36, and provides the function of limiting the current to the transmitter. Zener diode 34 is connected between control conductor 14 and node 36, and protects the transmitter from over-voltages which frequently occur on telephone cables.

Figure 2B:
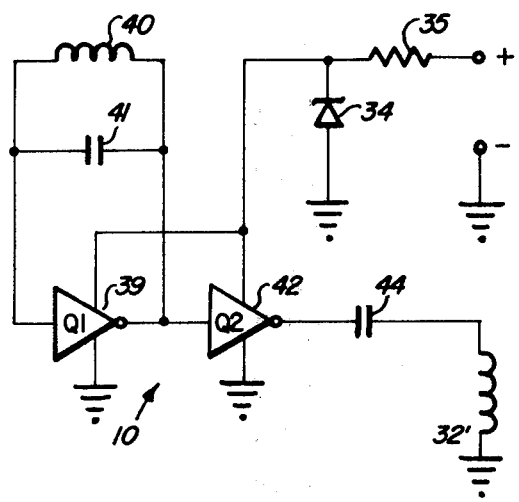
FIG. 2B is a schematic diagram of the transmitter of FIG. 2A.

Referring to FIG. 2B, L-C oscillator 30 may be readily implemented by means of a simple logic inverter 39 having an inductor 40 and a capacitor 41 coupled in parallel between the input and the output of inverter 39. Inverter 39 may be a simple logic inverter, such as one of the inverters in a Texas Instruments 74C04 hex inverter integrated circuit. The rf amplifier 31 may also be implemented using a logic inverter, which may be another of the inverters of the 74C04 hex inverter. The antenna block of FIG. 2A is schematically shown as a tuned circuit including capacitor 44 and inductor 32', which represents a ferrite antenna. The inductance of inductor 40 and the compacitance of capacitor 41 may be chosen by a suitable operating radio frequency, for example 448 kHz. Capacitor 41 and inductor 40 are enclosed in or shielded by metalic enclosure 139 to minimize frequency shift when the transmitter is buried, and covered with earth. The magnitude of the output signal from inverter 42 varies as the magnitude of the operating voltage applied between control pair conductors 13 and 14. As subsequently explained, the power signal is varied in amplitude; therefore, the signal transmitted by antenna 32' also varies in amplitude. In one embodiment of the invention, the frequency of the power signal variation is chosen to be one kHz; for this case, the signal transmitted by antenna 32' is an amplitude modulated 448 kHz signal with one kHz amplitude modulation.

The components of the transmitter 10' as shown in FIG. 2A are in practice mounted on a long, narrow printed circuit board. The inductor 40 and capacitor 41 of the L-C oscillator are housed in a metallic enclosure to minimize frequency shift when the encapsulated transmitter is covered by earth. The ferrite antenna 32' is mounted on the printed circuit board or, if convenient, on the IC package containing the hex inverters, or is merely tied in position prior to encapsulation. When the sealed transmitter assembly is encapsulated in the splice bundle as shown in FIGS. 1A-1C, and after the entire cable assembly is buried, the ferrite antenna 32' is optimally aligned for detection by the antenna of the receiver, shown in FIG. 4A.

Figure 3A:
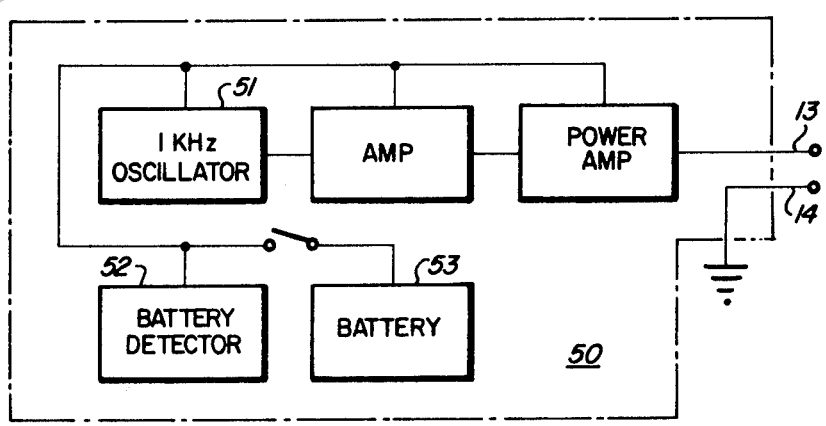
FIG. 3A is a block diagram of the exciter circuit which provides a modulated power signal to the transmitter.

FIG. 3A shows a block diagram of the exciter circuit connected to the control pair to power the transmitter connected thereto. This device actuates the buried transmitters, causing them to transmit the above-described amplitude modulated signal to facilitate locating of the respective buried splices. Although in its simplest form, the exciter circuit merely includes a switch connecting the control pair 13, 14 to a power source, it may be advantageous to superimpose a 1 kHz modulation signal on the power supply voltage by simply turning the supply voltage on and off at a 1 kHz rate. The 1 kHz rate is produced by oscillator 51. It is also convenient to provide a battery voltage level detector 52 to indicate when battery 53 is low and needs replacing or recharging.

The details of the individual blocks of FIG. 3A are shown in FIG. 3B. The inverters may all be implemented by simple logic inverters, such as those of the Texas Instrument 74C04 hex inverter integrated circuit. Zener diode 61 and resistor 62 detect a low battery condition by reducing the base current of transistor 65 when the battery voltage is low. This causes node 66 to rise, so that it exceeds the threshold voltage of inverter 56, thereby causing the output of inverter 56 to assume a "0" level, thereby turning the light emitting diode 60 on. Oscillator 51 is implemented by a pair of inverters and a resistor and capacitor as shown. The oscillator output is shaped and amplified by inverter 57 and complementary amplifier 58 to produce the 1 kHz power signal pulses on control pair 13, 14. For a twelve volt battery and a fifty percent duty cycle of the power signal, the power dissipation of the transmitter is roughly six milliwatts.

A block diagram of receiver 70 is shown in FIG. 4A. This receiver is a tuned radio frequency design with a ferrite antenna mounted at one end of a handle of the portable receiver. The receiver is mounted at the other end of a handle to facilitate observing a field strength meter and listening to the receiver output while keeping the antenna near the ground surface to facilitate detection of the signal transmitted by the buried transmitter. The receiver works well with a bandwidth of about six killohertz at the −6db level. A diode detector is utilized to demodulate the 1 kHz amplitude modulated signal received from the transmitter. The sensitivity control circuit is provided in the input circuit between the antenna and the first amplifier. No automatic gain control function is provided; therefore, the receiver is very responsive to changes in the signal strength. The field strength meter is coupled to the output of the frequency selective audio power amplifier. The receiver position then may be conveniently varied above the ground until the field intensity meter reading is maximized, at this point the buried splice has been located. The circuit details of a presently preferred embodiment of the receiver are shown in FIG. 4B. The inverters may all be those of the above-mentioned CMOS hex inverter; the operational amplifier may be a National Semiconductor LM 301. Those skilled in the art could easily implement the receiver from the diagram of FIG. 4B.

It should be noted that any properly designed receiver, regardless of the principle of operation, may be utilized to detect the signal from the buried transmitter. Superhetrodyne, superregenerative, and tuned radio frequency circuits have all been utilized with good results.

It is not necessary that the transmitted signal be modulated at all. Or, alternatively, the modulation of the transmitter output signal may be accomplished by modulation circuitry encapsulated with the transmitter, rather than by modulating the power signal sent over the control pair by the exciter; any other type of modulation, such as phase or pulse modulation could also be used.

It is also not necessary to the basic concept of the invention that the buried transmitter be directly connected to the control pair. An AC signal could be transmitted along the control pair and inductively coupled to the buried transmitter, where it could be rectified by a rectifying circuit within the buried transmitter to produce an internal DC operating voltage.

And of course, many variations on the circuitry of the transmitter may be successfully utilized.

I claim:

1. A method of locating a point along a pair of conductors comprising the steps of:
    (a) coupling a transmitter to said pair of conductors close to said point;
    (b) concealing said pair of conductors, said point, and said transmitter;
    (c) inducing power into said pair of conductors to provide operating power to said transmitter;
    (d) conducting power from said pair of conductors to said transmitter;
    (e) operating said transmitter at a first frequency in response to said power; and
    (f) varying the position of a receiver tuned to said first frequency to maximize the field strength of a signal received from said transmitter, wherein said pair of conductors is included in a main telephone cable and wherein said transmitter includes a pair of power receiving conductors, and wherein said method includes the step of splicing a telephone extension line to conductors of said main telephone cable, and connecting said power receiving conductors of said transmitter to said pair of conductors at the location of said splicing.

2. The method of claim 1 wherein said transmitter is encapsulated by a polyester filler material.

3. The method of claim 1 further including the steps of:
    (a) wrapping a sealant strip around said cable, said splice, and said transmitter to form a splice bundle including said splice, said transmitter, and a portion of said main telephone cable;
    (b) wrapping a protection sleeve around said splice bundle to provide a sealant therefor; and
    (c) heating said sleeve in order to shrink said sleeve and seal said sleeve with said sealant strip, thereby forming a completed sealed splice bundle resistant to moisture, corrosion, abrasion, freezing, and thawing.

4. The method of claim 3 wherein said transmitter includes an elongated ferrite antenna encapsulated with said transmitter, and wherein said method includes positioning said transmitter so that said ferrite antenna is substantially parallel to said main telephone cable before wrapping of the sealant strip.

5. A location finding system comprising:
    (a) a pair of control conductors;
    (b) a transmitter including an oscillator, a radio frequency amplifier, and an antenna encapsulated in a sealing substance and having first and second power receiving conductors thereof;

(c) means for including a power signal into said pair of control conductors to conduct operating power to said transmitter;

(d) means for conducting power from said pair of conductors to said power receiving conductors of said transmitter, thereby causing said transmitter to operate at a first frequency and transmit a signal from said antenna;

(e) a portable receiver tuned to said first frequency having an antenna for receiving said transmitted signal from said transmitter; and (f) field strength indicating means coupled to said receiver for producing an indication of the field strength of said signal transmitted from said transmitter, thereby permitting positioning of said portable receiver to maximize the intensity of the field strength received from said transmitter and thereby finding the location of said transmitter, wherein said pair of conductors is included with a telephone cable, and wherein said first and second power receiving conductors are respectively connected to said pair of control conductors, and wherein a splice between a telephone extension line and said telephone cable is located substantially at said connection of said first and second power conductors to said pair of control conductors, and wherein said transmitter is positioned along said telephone cable so that said ferrite antenna is substantially parallel to said telephone cable.

6. The location finding system of claim 5 wherein said oscillator, said amplifier, and said antenna are mounted on an elongated printed circuit board, and wherein said antenna is an elongated ferrite antenna, and wherein said oscillator is an L-C oscillator having its frequency determining inductor and capacitor shielded by a metalic shield to minimize frequency shift when said transmitter is buried by earth.

7. The location finding system of claim 6 wherein said transmitter is encapsulated in a sealing material.

8. The location finding system of claim 5 wherein said splice, said telephone cable, and said transmitter are all encapsulated together to form a sealed splice bundle.

9. A method of locating a point along a pair of conductors, said method comprising the steps of:

(a) coupling a transmitter to said pair of conductors close to said point:

(b) concealing said pair of control conductors, said point, and said transmitter;

(c) inducing power into said pair of conductors to provide operating power to said transmitters, said inducing including transmitting a power signal of periodically varying amplitude along said pair of conductors to said transmitter;

(d) conducting power from said pair of conductors to said transmitter;

(e) operating said transmitter at a first frequency in response to said power; and (f) varying the position of a receiver tuned to said first frequency to maximize the field strength of the signal received from said transmitter.

10. A method of locating a point along a concealed inaccessible cable, first and second conductors being disposed along with and concealed with said cable, said method comprising the steps of:

(a) connecting a transmitter having first and second power receiving conductors to said first and second conductors close to said point by splicing said first and second power receiving conductors, respectively, to said first and second conductors before concealing said cable and said first and second conductors;

(b) concealing said cable, said first and second conductors, said first and second power receiving conductors, said point, and said transmitter;

(c) inducing power into said pair of conductors to provide operating power to said transmitter;

(d) conducting power from said pair of conductors to said transmitter;

(e) operating said transmitter at a first frequency in response to said power; and (f) varying the position of a receiver tuned to said first frequency to maximize the field strength of a signal received from said transmitter.

11. A system for locating a point along a concealed cable, said system comprising in combination:

(a) first and second control conductors disposed along said cable and concealed with said cable;

(b) a transmitter including an oscillator, a radio frequency amplifier, and an antenna encapsulated in a sealing substance, said transmitter having first and second power receiving conductors coupled, respectively, to said first and second control conductors, said transmitter being concealed with said first and second control conductors and said concealed cable;

(c) means for inducing a power signal into said first and second control conductors to conduct operating power to said transmitter;

(d) means for conducting power from said pair of conductors to said first and second power receiving conductors to cause said transmitter to operate at a first frequency and transmit a signal from said antenna;

(e) a portable receiver tuned to said first frequency, said portable receiver having an antenna for receiving said transmitted signal from said transmitter; and (f) field strength indicating means coupled to said receiver for producing an indication of the field strength of said signal, thereby permitting positioning of said portable receiver to maximize the intensity of the field strength of said signal to assist in finding the location of said transmitter.

* * * * *